(12) United States Patent
Lancaster et al.

(10) Patent No.: US 7,181,364 B2
(45) Date of Patent: Feb. 20, 2007

(54) AUTOMATED DETECTING AND REPORTING ON FIELD RELIABILITY OF COMPONENTS

(75) Inventors: Larry Lancaster, Alameda, CA (US); Raymond M. Cooke, El Granada, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 66 days.

(21) Appl. No.: 11/106,944

(22) Filed: Apr. 15, 2005

(65) Prior Publication Data

US 2006/0235649 A1  Oct. 19, 2006

(51) Int. Cl.
*G06F 11/30* (2006.01)
(52) U.S. Cl. .................. 702/182; 702/179; 703/21
(58) Field of Classification Search ............ 702/80–84, 702/179, 181, 180, 58, 59, 182–188
See application file for complete search history.

(56) References Cited

U.S. PATENT DOCUMENTS

| | | | |
|---|---|---|---|
| 7,065,624 B1* | 6/2006 | Zahavi | 711/170 |
| 2005/0138285 A1* | 6/2005 | Takaoka et al. | 711/114 |
| 2005/0246503 A1* | 11/2005 | Fair | 711/147 |
| 2006/0047902 A1* | 3/2006 | Passerini | 711/114 |
| 2006/0112219 A1* | 5/2006 | Chawla et al. | 711/114 |

* cited by examiner

*Primary Examiner*—Hal Wachsman
(74) *Attorney, Agent, or Firm*—Blakely, Sokoloff, Taylor & Zafman, LLP

(57) ABSTRACT

An automated system to identify, categorize, detect, and report on unreliable components based on defining, generating, transmitting, collecting, aggregating, and operating on product operational data for observations received from devices in the field, such as over a network. In response to an observation for a product, the automated system automatically updates reliability statistics for components or families associated with the observation according to a set of computations or arithmetic operations without recalculating the reliability statistic.

25 Claims, 6 Drawing Sheets

AUTOMATED DETECTING AND REPORTING ON FIELD RELIABILITY OF COMPONENTS

BACKGROUND

1. Field

The field of the invention relates to auto-detection of reliability indicators of devices in the field according to reliability statistics of data automatically gather and analyze by a machine.

2. Background

Gathering and analyzing data on the reliability of electronic devices and components in the field is typically a computer-assisted manual process. The person analyzing the data uses domain expertise to select, sort, and/or review data gathered about a product or components within that domain. Often, the reliability data to be analyzed is gathered in a similar manner, such as by a person requesting or obtaining data based on domain expertise.

As the number of devices in the field and the number of components per device increase, the job of gathering and analyzing the reliability data can become overwhelming. For example, performing reliability analysis for 10,000 devices in the field, each including approximately 100 components, where each component has four potential reliability indicators, can include gathering and analyzing up to 4 million pieces of data each time an analysis or review is desired. It can be appreciated that such gathering and analysis may become prohibitively time consuming, with respect to manpower, and expensive with respect to cost.

For example, manually gathering and analyzing reliability data for data storage devices in the field, such as network servers, file servers, or Internet servers having numerous mass storage devices (e.g., optical and/or magnetic disk drives), components, and software will become more difficult as the number of data storage devices and mass storage devices increases over time.

SUMMARY

The present invention includes using a machine to compute reliability statistics of products according to a plurality of received observations of operational data of the products. An operational data model of each product defines a set of uniquely identified components of the product, and the computations include computations performed on the observations, the uniquely identified components of each product, and overlapping component families to which the components belong.

BRIEF DESCRIPTION OF THE DRAWINGS

Various features, aspects and advantages will become more thoroughly apparent from the following detailed description, the set of claims, and accompanying drawings in which:

DETAILED DESCRIPTION

Figure 1:
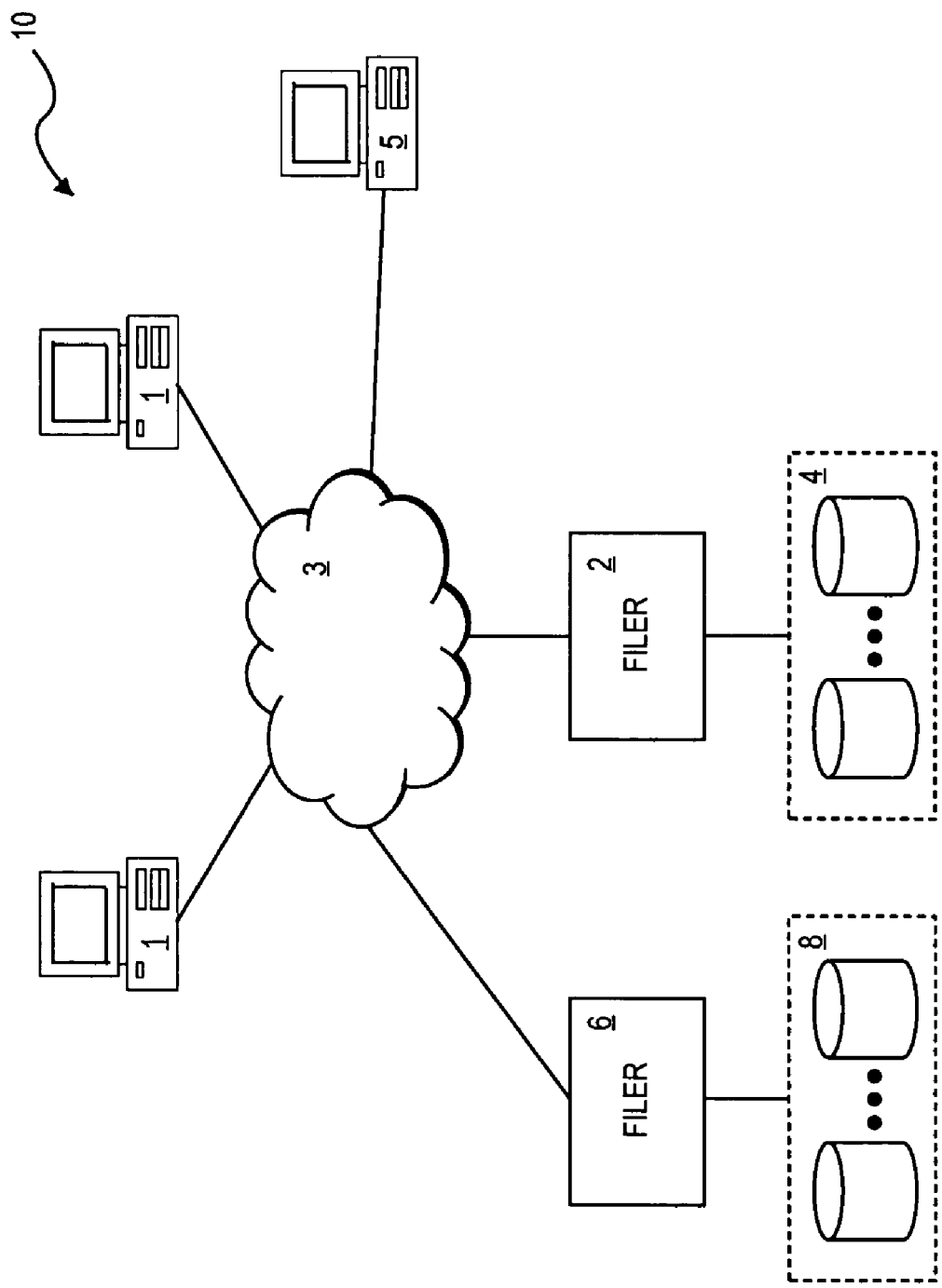
FIG. 1 shows an example of a network environment.

The techniques being introduced here include a system, which after defining certain parameters of operation, may automatically gather data for, identify, categorize, detect, and report on unreliable components. These unreliable components may be components of a product or device, such as a data storage system, data storage device, mass storage device, disk drive, components thereof, and/or software thereof. Operational data models of products, reliability statistics, parameters for observations, statistical significant separations of observation information, and standards to assess whether a separation is different than prior separations, can be defined by somebody who has domain expertise in the devices and components and potential reliability thereof. The reliability data or observations may be transmitted by or gathered from devices and devices components over a network. Specifically, reliability data, observations, and/or events can be generated by data storage devices and transmitted by the data storage devices to an automated system. The automated system can then collect, aggregate, perform a statistical analysis, and/or operate on device operational data in a combination of ways that is unrealistic without such an automated system.

For example, an automated system can compute initial reliability statistics, receive observations from data storage devices in the field, collect, aggregate, store, and retrieve observations or data from the observations. The system can also associate each observation to a component or mass storage device and to one or more overlapping component families to which the components belong. The system can then determine reliability statistics for each component according to computations performed on observations associated with the component and component families to which the component belongs. The system can also make a determination as to when an observation has affected a statistically significant separation in reliability statistics, and send an alert if a determination is different than previous determinations.

As a result, unreliable components and component families can be identified to any given degree of statistical certainty without the components and component families being specified, such as by a system administrator or operator of the automated systems. Moreover, queries do not need to be performed (such as by a system operator) for someone to be notified of relevant results (such as by the operator receiving an alert from the automated system). In other words, the automated system is able to compute overlapping component families for uniquely identified components of a product; and perform and learn the results of reliability analysis on multiple components or component families in a timely and cost effective fashion.

It can be appreciated that such automated gathering, analysis and alerts will save manpower, costs, and other resources as compared to a manual or computer assisted method or system. Moreover, such automated gathering and analysis is can be versatile and dynamic by providing adjustments to the method or system prior to, during, and/or after gathering and analyzing data. Such adjustments that may be made by somebody who has domain expertise in the devices and components, and/or by an expert or artificial intelligence system.

FIG. 1 shows a simple example of a network environment 10, which incorporates a storage server 2 and an autodetection machine 5 to automatically detect and report on field reliability of components of storage server 2. Storage server 2 is shown in FIG. 1 coupled locally to storage subsystem 4 which includes a set of mass storage devices, and through network 3 to machine 5 and to set of clients 1. Network 3 may be a local area network (LAN), intranet, the Internet, or various other networks over which data is communicated using wired optical, wireless, acoustical, electromagnetic radiation, or other medium as known in the art. Each of clients 1 may be, for example, a personal computer (PC), work station, electronic device, computational device, or the like, as known in the art. Storage subsystem 4 is managed by storage server 2. Storage server 2 may receive and respond to various read and write requests from clients 1, directed to data stored in or to be stored in storage subsystem 4. Storage subsystem 4 may include one or more data storage devices, each including a set of mass storage devices. Each mass storage device may be, for example, a conventional magnetic disk, an optical disk such as a compact disk-read only memory (CD-ROM), or digital video disk (DVD) based storage, magneto-optical (MO) storage, organic, biological, or any other type of non-volatile storage devices suitable for storing large quantities of data as known in the art.

Storage server 2 may have an architecture as known in the art for a network server, file server, or storage server. It is considered that storage server 2 may be a file server, or could be a server that provides clients with block-level access to stored data (such as used in a storage area network (SAN)), or a server than can provide both file-level or block-level access. For example, storage server 2 may have numerous mass storage devices (e.g., tape drives, optical disk drives, and/or magnetic disk drives) as well as various components and software necessary to control the disk drives and reading and writing of data to and from the disk drives. In some cases, storage server 2 may have a consolidated architecture including network communication components, file system functionality, and/or storage subsystems within a single chassis or machine. Specifically, storage server 2 may have an integrated architecture, where the network and data components are all contained in a single box. Alternatively, file system 2 may have a distributed architecture; for example, it may include a separate network blade and disk blade (not shown). The network blade may be used to communicate with clients 1, while the disk blade includes a file system functionality and is used to communicate with storage subsystem 4. The network and disk blades may communicate with each other using internal protocol.

As such, storage server 2 may represent a data storage device, network server, file server, where reading data from mass storage devices and writing data to mass storage devices of server 2 is controlled by an operating system and/or controlled by a system external to server 2. For example, server 2 may be a storage server having a special-purpose processing system that allows it to be used for many different purposes, such as to provide multiple users with access to shared data or backup mission critical data. Moreover, server 2 may operate on behalf of one or more clients to store and manage shared filed in a set of mass storage devices which may be organized into one or more volumes of redundant array of inexpensive or independent disks (RAID).

It is contemplated that storage server 2 may include essentially any number of mass storage devices. For instance, storage server 2 may include 2, 3, 4, 5, 10, 20, 30, 50, 100, 200, 400, 800, 1600, or a combination thereof of mass storage devices. Mass storage devices may include a disk drive, a hard disk (HDD), a flash memory, a random access memory (RAM), firmware, or other media capable of having data written to it and read from it.

In addition, storage server 2 may include various components, families of components, and related families of components, such as the devices, drives, components, software blades mentioned above and described below with respect to FIGS. 2 and 3. Components, component families, and related component families may or may not be identified or categorized according to the manufacturer, configuration, batch, release date, configuration, or other identifying information related to components and/or software thereof. For example, components, component families, and related component families may be identified or distinguished by the manufacturer, process of manufacture, materials, specification, revision, build, configuration, modification, mark, model, or other delineator of a component, a sub-component of the component, and/or functionality of the component or sub-components. A component configuration or batch may include a production batch by a single manufacturer, single plant, single production line, or according to a single manufacturer or batch process. Likewise, a component, component family, and/or related component family may be defined as known in the art (e.g., such as in the art of component reliability analysis). Moreover, components may be identified or categorized by a component identity, a component configuration, a component individual variation, a set of component events (e.g., data from current observations), and/or historical statistics (e.g., past observations or events) relating to the component, an overlapping family in which the component is included, or related component families to each component family of the component.

Storage server 2 and/or machine 5 further may be coupled through a switching fabric or network (e.g., network 3) to other similar storage servers which have their own local storage subsystems. For example, FIG. 1 shows storage server 6, which may be a storage server similar to storage server 2 as described above. Storage server 6 is shown having storage subsystem 8. Subsystem 8 may be storage subsystem similar to storage subsystem 4 as described above. In addition, the relationship between server 6 and subsystem 8 may be similar to that between server 2 and subsystem 4, as described above. Server 2 and server 6 may have separate, independent local control of their storage subsystems, may have control of their storage subsystems that depend on each other (e.g., such as where server 6 or server 2 controls both subsystems), may be each subject to an independent controller for accessing their subsystems, or may both have their access (e.g., reading and writing) to their subsystems controlled by a similar controller external to both servers.

FIG. 1 shows auto-detection machine 5 coupled to server 2 and server 6 via network 3. Auto-detection machine 5 may be an aggregation point for receiving, gathering, or collecting reliability data or observations from servers 2 and 6. For example, servers 2 and 6 may be servers of a product or service customer, such as rented, leased, purchased, or commonly owned devices with respect to ownership of auto-detection machine 5. Alternatively, auto-detection machine 5 may be rented, leased, purchased, contracted, or otherwise enjoyed to perform auto-detection on the servers.

Also, the physical relationship between each of client 1, server 2, server 6, and auto-detection machine 5 may be defined as "local" such as where two of the devices are geographically located within one block, within one plant, within one factory, within one business location, within one building, on one floor, or within one room. Alternatively, the relationship between any of the devices may be defined as "remote", such as where the devices are not located locally. Specifically, it is contemplated that server 2 and server 6 are located remotely from machine 5, regardless of whether server 2 and server 6 are local to each other.

Note, however, that automated detecting and reporting on field reliability of components as introduced herein is not limited to use in traditional storage servers. For example, the technique can be adapted for use in other types of local or remote devices, mass storage devices, storage systems, electronic systems, and computational devices which have access to a network, such as network 3.

With respect to observations and reliability data, the servers (e.g., servers 2 and 6) and subsystems (e.g., subsystems 4 and 8) may be considered a single, or separate entities for which the data and observations are transmitted to, gathered or collected by auto-detection machine 5. Thus, server 2 and server 6 may be product devices of the same or different products or models, such as defined by an operational data model of a product that defines a set of uniquely identified components of the product. Components of the product may include components as described above with respect to storage server 2. For example, an operational data model may include components identified uniquely according to manufacture, batch, model number, specification, materials, revision, "build", configuration, modification, mark, model, or another delineator of components for defining a model as known in the art. An operational data model may also uniquely identify components produced by a single manufacturer, at a single plant, on a single production line, or according to a "standard" as known in the art.

Figure 2:
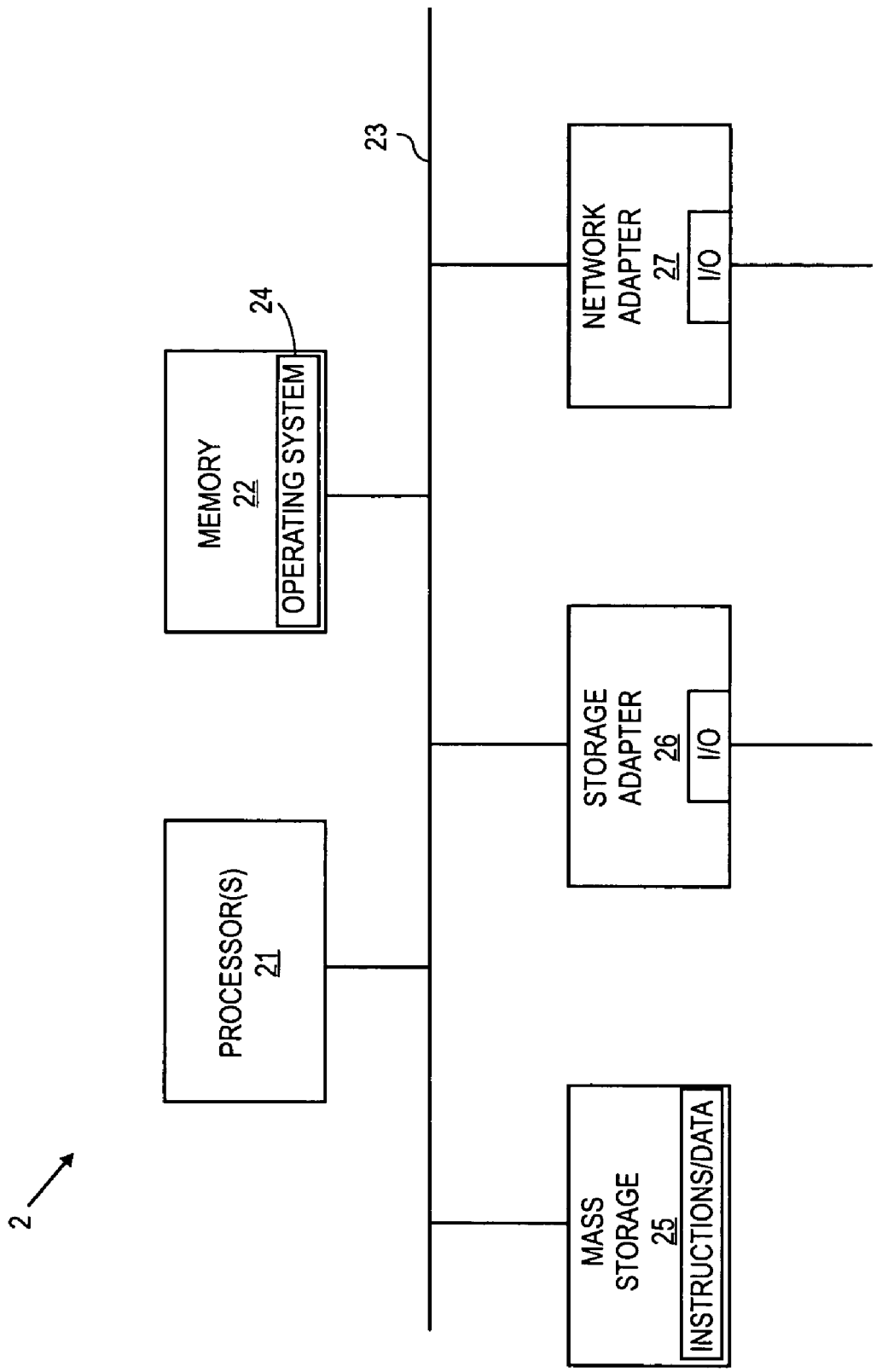
FIG. 2 is a block diagram showing an architecture of a storage server.

FIG. 2 is a block diagram showing an architecture of a storage server. FIG. 2 shows storage server 2, and some components thereof, according to certain embodiments of the invention. Certain standard well-known components, which are not germane to the present invention, may not be shown. Storage server 2 includes one or more processors 21, and memory 22 coupled to bus system 23. Bus system 23, shown in FIG. 2, is an abstraction that represents any one or more separated physical buses and/or point-to-point connections, connected by appropriate bridges, adapters and/or controllers. The bus system 23, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 21 are the central processing units (CPUs) of the storage server 2 and, thus, control the overall operation of the storage server 2. In certain embodiments, the processors 21 accomplish this by executing software stored in memory 22. A processor 21 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 22 is or includes the main memory of the storage server 2. Memory 22 represents any form of random access memory (RAM), read-only memory (ROM), flash memory, or the like, or a combination of such devices. Memory 22 stores, among other things, the operating system 24 of the storage server 2, in which the error detection techniques introduced above can be implemented.

For example, operating system 24 may include a sequence of instructions or software to periodically, upon occurrence of an observation, or upon occurrence of an event, send data (e.g., such as data including observations and/or events) to an aggregate point, such as to machine 5 over network 3. Moreover, operating system 24 may include a file system, communication protocol, storage access routines, error detection routines, and input output routines such as for network access and storage driver access. In some cases, operating system 24 may include the functionality described above where other functionality in several modules or layers. It is contemplated that operating system 24 may be an operating system as known in the art for a server such as server 2 as described herein.

Also connected to the processors 21 through the bus system 23 are one or more internal mass storage devices 25, a storage adapter 26 and a network adapter 27. Internal mass storage devices 25 may be or include any conventional medium for storing large volumes of data in a non-volatile manner, such as one or more magnetic or optical based disks. The storage adapter 26 allows the storage server 2 to access the storage subsystem 4 and may be, for example, a Fibre Channel adapter or a SCSI adapter. The network adapter 27 provides the storage server 2 with the ability to communicate with remote devices, such as the clients 1, over a network and may be, for example, an Ethernet adapter or Fibre Channel adapter (e.g., in a SAN implementation). Storage adapter 26 and network adapter 27 may have input/output hardware, adapters, or connectors (e.g., described herein as an I/O) for communicating data with subsystem 4 and remote devices. Thus, reliability data and observations may be transmitted, gathered, and analyzed as described herein for server 2, mass storage 25, adapter 26, and storage subsystems coupled to adapter 26, as described herein.

Figure 3:
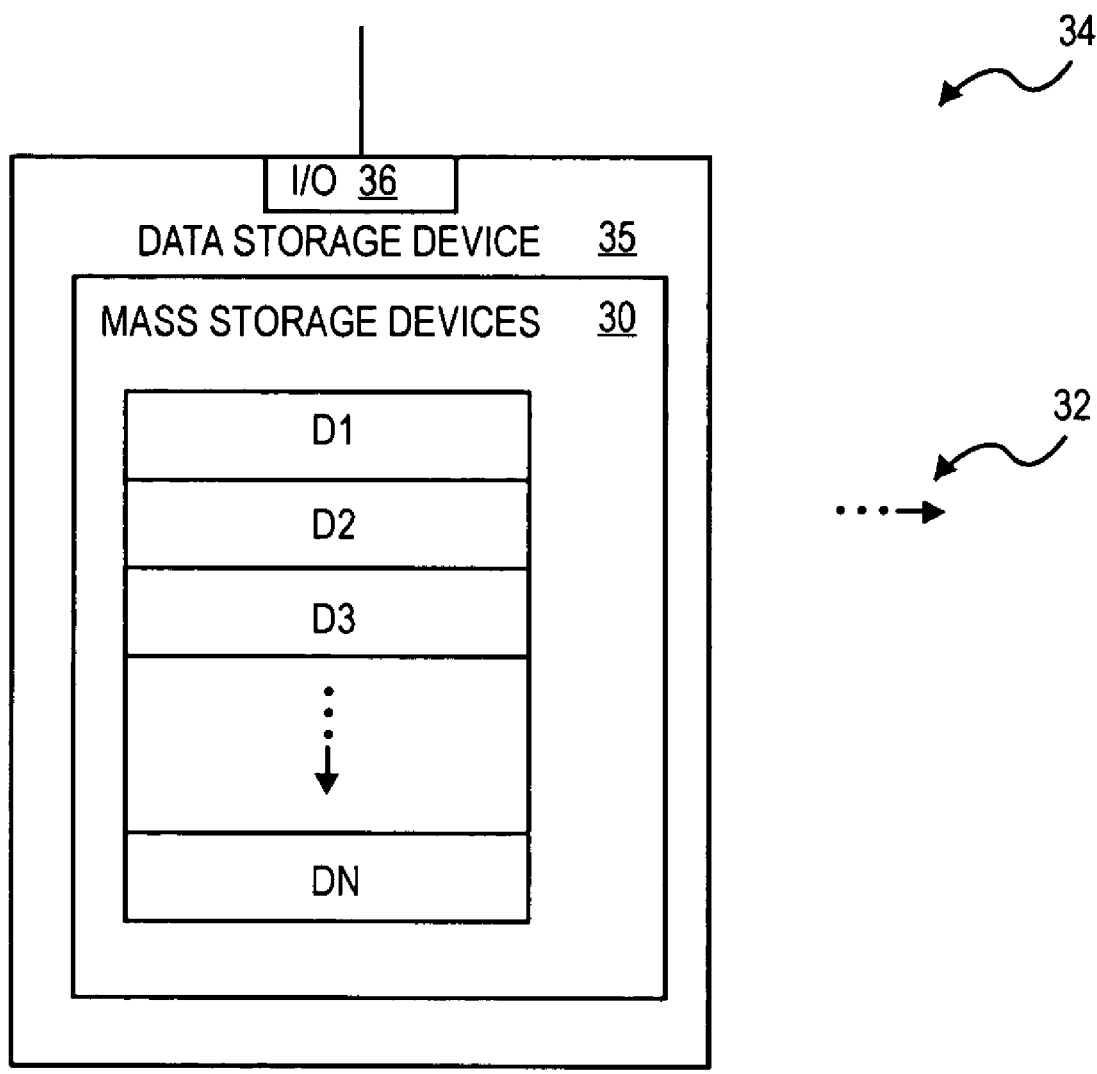
FIG. 3 shows a block diagram of a data storage device of a storage server.

FIG. 3 shows a block diagram of a data storage device for a storage server. FIG. 3 shows storage subsystem 34 and components thereof, such as components described above with respect to storage server 2 (e.g., see FIGS. 1–2) that are part of subsystem 34. Subsystem 34 is shown having input output I/O 36 for communicating data between subsystem 34 and filer 2, data storage device 35, and mass storage devices 30. I/O 36 may be an I/O such as described above with respect to storage adapter 26. Specifically, the I/O of adapter 26 may interface I/O 36 to communicate data therebetween. Subsystem 34 may be part of a data storage system, a data storage system, or a data storage device. In some cases, subsystem 34 may be a storage subsystem such as subsystem 4 described above in FIGS. 1–2.

Subsystem 34 may include components, families of components, and related families of components as described above with respect to server 2. For example, in FIG. 3, subsystem 34 includes data storage device 35 having mass storage devices 30. Subsystem 34 may include more than one of storage devices 35 as indicated by arrow 32 which may represent zero or more additional data storage devices, such as device 35. For example, subsystem 34, device 35, devices 30, and components thereof may include motherboards, tape drives, disk drives, media changers, adapters, databases, interface ports, I/O's, shelves, shelf modules (e.g., such as to address data to different bays in a shelf), controllers, power supplies, integrated circuit (IC) chips, relays, and virtual components such as aggregates, volumes, plexes, RAID groups. Thus, subsystems 34 may include various components as known in the art. For example, FIG. 3 shows device 35 having I/O 36. I/O 36 may be a conduit for inputting data to and outputting data from device 35, and/or controlling such input and output, such as for communicating with bus system 23, as described above. It is contemplated that storage adapter 26 and/or network adapter 27 may also have an I/O similar to that described with respect to I/O 36.

For instance, mass storage devices 30 may be or include one or more data storage systems, data storage devices, and/or mass storage devices, as described herein. For example, FIG. 3 shows devices 30 having mass storage devices D1, D2, D3, . . . DN. Thus, devices 430 may include virtually any number of mass storage devices. For example devices 430 may include 1, 2, 3, 4, 5, 10, 20, 40, 50, 60, 65, 70, 75, 80, 85, 90, 95, 100, 200, 400, 800, 1600, or a combination thereof of mass storage devices. Each of storage devices 30 and devices D1 through DN may include components, families of components, and related families of components. Also, each mass storage device, such as device D1 may include components such as one or more storage media, controllers, motor, heads, IC chips, input/outputs (I/O's), or other components of mass storage devices as known in the art.

Thus, reliability data, observation, events, and/or historical statistics may exist, be defined, be generated, be transmitted, be received, be gathered, be associated, be analyzed, be updated, be observed, or be considered in determining reliability statistics for server 2, subsystem 34, device 35, devices 30, mass storage devices, and/or components thereof. As described above, such observations, events, and/or data may be received or gathered at or by auto-detection machine 5.

Figure 4:
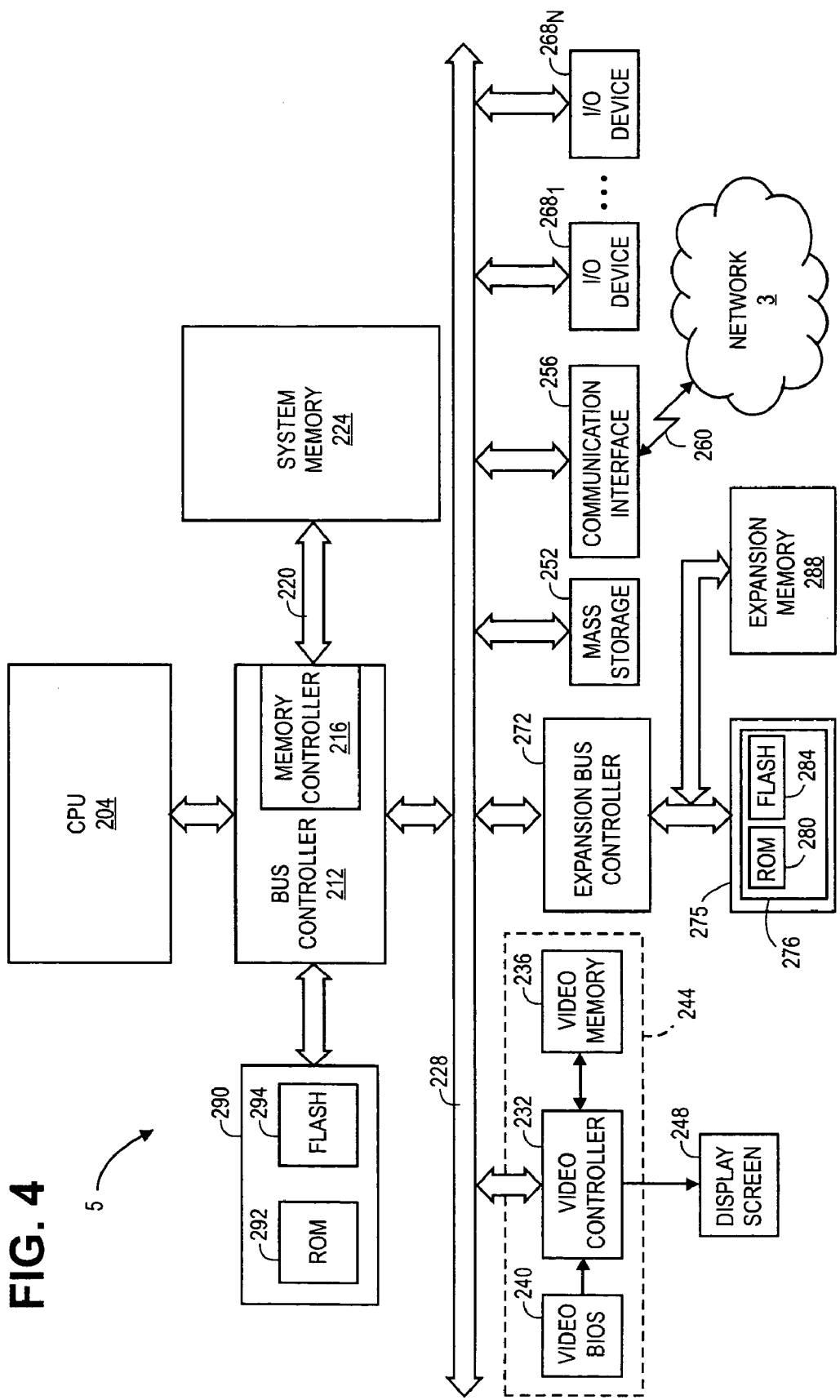
FIG. 4 shows an auto-detection machine in accordance with an embodiment of the invention.

For example, FIG. 4 shows a computer system that may be used as auto-detection machine 5, in accordance with some embodiments. Referring to FIG. 4, auto-detection machine 5 includes a processor or a central processing unit (CPU) 204. CPU 204 may include an Arithmetic Logic Unit (ALU) for performing computations, a collection of registers for temporary storage of data and instructions, and a control unit for controlling operation for machine 5. In one embodiment, the CPU 204 includes any one of the x86, Pentium or other processor (e.g., for a PC as known in the art). The CPU 204 is not limited to microprocessor but may take on other forms such as microcontrollers, digital signal processors, reduced instruction set computers (RISC), application specific integrated circuits, and the like. Although shown with one CPU 204, auto-detection machine 5 may alternatively include multiple processing units, such as by including a co-processor.

The CPU 204 is coupled to a bus controller 212 by way of a CPU bus 208. Bus controller 212 includes a memory controller 216 integrated therein, through memory controller 216 may be external to bus controller 212. Memory controller 216 provides an interface for access by the CPU 204 or other devices to system memory 224 via memory bus 220. In one embodiment, system memory 224 includes random access memory (RAM), such as synchronous dynamic random access memory (SDRAM). System memory 224 may optionally include any additional or alternative high speed memory device or memory circuitry. Bus controller 212 is coupled to system bus 228 that may be a peripheral component interconnect (PCI) bus, Industry Standard Architecture (ISA) bus, etc. Coupled to system bus 228 are video controller 232 (such as a graphics controller, or a graphics engine), a mass storage device 252, communication interface device 256, one or more input/output (I/O) devices 2681–268N, and expansion bus controller 272. Video controller 232 is coupled to video memory 236 (e.g., 8 Megabytes) and video BIOS 240, all of which may be integrated onto a single card or device, as designated by numeral 244. Video memory 236, and video BIOS 240 includes code and video services for controlling video controller 232. In another embodiment, video controller 232 is coupled to CPU 204 through an Advanced Graphics Port (AGP) bus. Video controller 232 provides a video signal to displace screen 248. For example, controller 232 may send a signal to display a reliability indicator alert via display screen 248 to be observed by a person or operator of machine 5 (e.g., a system operator).

It is also contemplated that the alerts may take the form of emails sent to operators and users. The purpose of an alert is to let an operator or user know that a reliability indicator has been detected among the data points collected. A reliability indicator is a data point with which one can discern statistically significantly different reliability characteristics between one component and a family to which it belongs, or between one component family and a related component family. Using this indicator, an operator can infer that particular components are more likely to fail than others in the same component family, or that particular component families are more prone to failure than are related component families.

An alert may include a reliability indicator, report of potential unreliability (such as in the future), report of anticipated failure, report of estimated time to failure, and other reliability data and statistics gathered, analyzed, computed or otherwise known by machine 5 for components, component families, and related component families. An alert may also statistical significant separations, assessments that a determination is different than any previous determination, and alerts as described below with respect to blocks 540 and 550 of FIG. 5; and blocks 650, 660, and 670 of FIG. 6.

The mass storage device 252 includes (but is not limited to) a hard disk, floppy disk, compact disk read only memory (CD-ROM), digital video disk read only memory (DVD-ROM), tape, high density floppy, high capacity removable media, low capacity removable media, solid state memory device, and combinations thereof. Communication interface device 256 includes a network card, a modem interface, or a similar communications device for accessing network 3 via communications link 260. In addition, communications interface device 256 may include communication ports such as serial ports (e.g., IEEE RS-232), parallel ports (e.g., IEEE-1284), Universal Serial Bus (USB) ports, and infra-red (IR) ports. Thus device 256 may receive observations, events, reliability data, operational data, models, reliability statistics, data model parameters, statistical significant separations, standards to assess whether a determination is different from prior determinations, and definitions thereof (e.g., such as programmed by a programmer, person, or system operator) via network 3.

The I/O devices 268–268N include a keyboard, mouse, audio/sound card, printer, and the like. For example, an audio sound card may be coupled to one or more speakers which may provide a reliability indicator alert to be witnessed or heard by a person (e.g., such as a system operator of machine 5). Also, a keyboard, mouse, and the like may be used to input. Moreover, an alert as described herein may be stored in memory 224, ROM 292, or communicated via I/O device 268. Likewise, an alert may be an email sent via communication interface 256, such as to another electronic device via network 3 (e.g., for communication such as to a person via a video screen and/or speaker). In addition, a keyboard and/or mouse may be used to locally input observations, events, reliability data, operational data, models, reliability statistics, data model parameters, statistical significant separations, standards to assess whether a determination is different from prior determinations, and definitions thereof (e.g., such as when machine 5 is locally or directly programmed by a programmer, person, or system operator).

Expansion bus controller 272 is coupled to nonvolatile memory 275, which includes system firmware 276. System firmware 276 includes system BIOS 82, which is for controlling, among other things, hardware devices in machine 5. System firmware 276 also includes ROM 280 and flash (or EEPROM) 284. Expansion bus controller 272 is also coupled to expansion memory 288 having RAM, ROM, and/or flash memory (not shown). Machine 5 may additionally include memory module 290 that is coupled to bus controller 212. In one embodiment, memory module 290 comprises ROM 292 and flash (or EEPROM) 294.

Moreover, autodetection machine 5 may include a computer program, application, or sequence of instructions running on or executed by a server (e.g., similar to server 2) and accessing a database (e.g., one or more databases or tables including parameters of operation, reliability statistics, data model parameters for observations, statistically significant separations, reliability data, observations, events, and/or historical statistics). The database may or may not be hosted on a computer other than machine 5, and may or may not be using mass storage served by a third computer or file server (e.g., similar to server 2 and/or subsystem 4).

As is familiar to those skilled in the art, machine 5 may further include an operating system (OS) and at least one application program, which in one embodiment, are loaded into system memory 224 from mass storage device 252 and launched after power on self test (POST). The OS may include any type of OS including, but not limited or restricted to, disk operating system (DOS), Windows, Unix, Linux, OS/2, OS/9, Xenx, etc. The operating system is a set of one or more programs which control machine 5's operation and the allocation of resources. The application program may be a set of one or more software programs that performs a task desired by the user.

Auto-detection machine 5 (such as in memory 224 and/or 288) may include or may access a machine accessible medium containing a sequence of instructions that, when executed, cause machine 5 to perform the functions described herein. In addition, it is contemplated that the functions of machine 5 may be implemented in a machine implemented method, such as by machine 5 without assistance by a person or operator. Moreover, a machine implemented method may include performing functions described herein by hardware, software, a computer, machine 5, a sequence of instructions, or according to a machine accessible medium. The sequence of instructions may be executed by machine 5 (e.g., such as by CPU 204) to cause machine 5 to perform the functions described herein (wherein those instructions may or may not be part of the operating system of machine 5).

Auto detection machine 5 (such as in memory 224, and/or 288) may include one or more databases for storing and recalling parameters of operation, reliability statistics, data model parameters for observations, statistically significant separations, reliability data, observations, events, and/or historical statistics (such as described further below with respect to block 510 of FIG. 5). For instance, such data may be stored in one or more databases in those memories. In some cases, that data may be stored in a set of tables of one or more databases that a processor may control writing to and reading or gathering data from according to various categories, distributions, components, families, related families, statistics, observations, events, failure events, and/or historical statistics. Specifically, the data may be written and read from memory considering reliability, entity or component attributes, failure events, potential failures, and otherwise in order to predict failed components or components estimated to fail within a time threshold, such as a selected period. Moreover, such databases may include flat files, relational databases, and/or personal computer databases as known in the art. Thus, machine 5 may be defined as a "aggregation" point for gathering, storing, recalling, analyzing, and providing alerts for or related to reliability data, observations, and/or events.

A person may define parameters of operation of auto-detection machine 5 using a keyboard, mouse, voice recognition, or data communicated to system 5 over network 3, or I/O device 268. Moreover, such parameters of observation may be stored in memory 224, memory 228, or ROM 292. Specifically, operational data models of products, reliability statistics, data model parameters for observations, statistical significant separations, in standards to assess whether a determination is different may be input or defined as defined as described above. Similarly, reliability data, observations, events, and/or historical statistics may be received or communicated to system 5 and stored in system 5 as described above. It is also considered that such data, observation, events, and statistics may be processed by system 5, suggested using CPU 204, memory 224, memory 228, mass storage 252, ROM 292, flash 294, and/or other resources of or available to system 5. In some cases, a set of uniquely identified components for products, a plurality of overlapping component families to which components belong, and related component families to other component families can be input, defined, stored, retrieved, and processed as described above.

As used herein, an observation may include an event related to a component, component family, or related component families. An observation may also include a "snapshot" of a data configuration or identities of a component, family of components, group of components, or number of various components of a device (e.g., such as server 2 or parts thereof). For example, a snapshot may include a bundle of data including the configuration of components for reliability purposes as well as events related to those components. A useful analogy is that a device or server having components may be represented by a basket of fruit for which the snapshot may identify the number and kind of fruit in the basket, while the events indicate which fruit, if any, is bad.

A failure may be defined as an event indicating that a component or component family has temporarily or permanently failed, or is predicted to fail within a certain period, such as a selected period of time. For example, a failure may be defined as a slow error recovery, a data read or write error, multiple errors, a temporary off-line status, a write fault, a servo marker problem, and/or various events outside of the operational specification of a device or component.

Also, historical statistics may include previous data gathered by machine 5, such as previous observations and events. For example, historical statistics may include observations and/or events gathered by machine 5 during operation, such as from server 2. Moreover, historical statistics may include previous data gathered prior to operation of machine 5 for other than by machine 5. For example, historical statistics may include statistics generated from data gathered by other systems, similar to machine 5, or by other means, and/or analysis of such data by a person, or machine. Thus, historical statistics may include analysis by machine 5 of previous observations and events gathered by machine 5, or data programmed into machine 5 from external analysis, observations and/or events.

Various other observations, events, failures, and historical statistics are also contemplated for machine 5 and processes therefore, as known in the art (e.g., such as in the art of reliability analysis and statistics).

Figure 5:
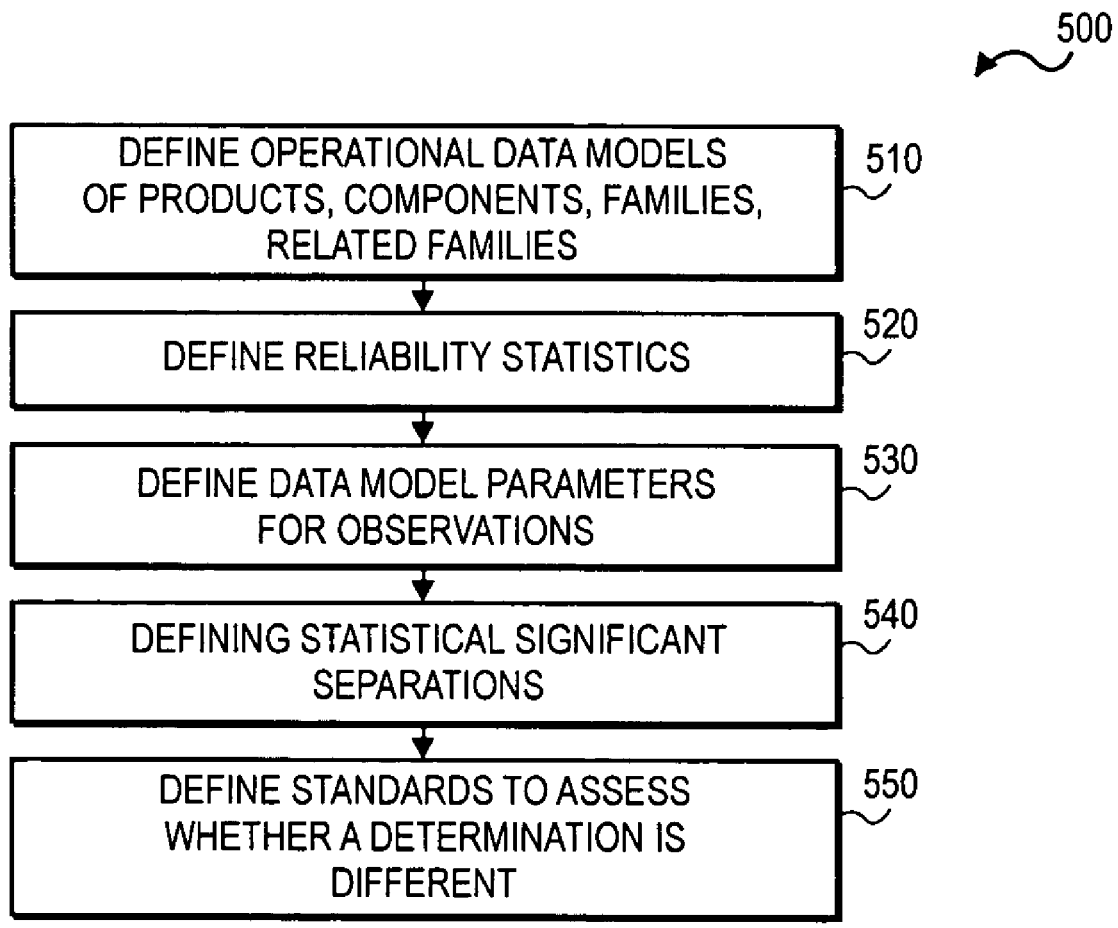
FIG. 5 is a flow diagram of a process for defining parameters of operation of an auto-detection machine, in accordance with an embodiment of the invention.

FIG. 5 is a flow diagram of a process for finding parameters of operation of an auto-detection machine, in accordance with an embodiment of the invention. FIG. 5 shows process 500 for defining parameters of operation, such as where those parameters are defined by a person, a system administrator, a system operator, someone with domain expertise regarding the devices and components thereof, or by another non-automated or non-machine implemented method. It is also contemplated that the parameters may be defined by an automated or machine-implemented method. For example, the parameters may be parameters to determine reliability indicators for a server device, such as server 2, as described above with respect to FIGS. 1–3 and may be input or defined and used by an auto-detection machine, such as machine 5, as described above with respect to FIGS. 1 and 4.

At block 510, operational data models of products are defined. For example, block 510 may include defining, predefining, or identifying an operational data model of a product to define a set of uniquely identified components or a unique configuration of a component of the product (e.g., a product "in the field", such as by being in operational use at a location), one or more overlapping component families to which each component belongs, and/or one or more related component families to each component family. It is also considered that the overlapping families and related component families may be computed by an automated method, such as by auto-detection machine 5. For example, the overlapping component families and/or related component families may be defined or computed prior to computing reliability statistics according to received observations for components, overlapping component families, and/or related component families.

Overlapping component families may be defined by a combinatorial expansion of a common component included in more than one set of uniquely identified or configurations of components of more than one product, and/or a similar component function included in more than one set of uniquely identified components of more than one product. The space of component families over which one or all components of a product may exist is defined by the combinatorial expansion of all configurations and all individual variations observed in the component and/or product. Moreover, the space of component families may be restricted to a set of families for consideration, such as by an algorithm.

Component families may include a global system family of products in the field, such as internationally, nationally, or geographically constricted to a region; a system family for products including the component, such as for data storage units including mass storage devices and components thereof; a component configuration family for configurations of a component, such as a family of related configurations of a mass storage device; a component individual variation family for variations of individual configuration, such as a defined or selected subset of the component configuration family or a selected number of variations of that family, component event families defined by selected events that occur or may occur to a component, historical statistical families defined by historical statistics that occur or will occur to a component, and otherwise as known in the art.

Similarly, related component families may be determined or defined to each component family based on a combinatorial expansion of one or more configurations and individual variations observed in the families. A space of related families over which one or all component families may exist, may be defined by a combinatorial expansion of all configurations and all individual variations observed in products and/or families. Moreover, the space of related families may be restricted to a set of related families for consideration by an algorithm. Defining an operational data model may include distribution parameters for a plurality of product devices of the product to which the operational data model applies, to send observations to be received by an automated system (e.g., auto-detection machine 5) over a network (e.g., network 3). In other words, defining an operational data model may include pre-identifying data distribution parameters from products in the field, so that those products distribute observations (e.g., including events and historical statistics) over a network to an appropriate automated system for gathering, analysis, and alert generation as desired.

At block 520, reliability statistics for a component, overlapping component families to which the component belongs, and/or related component families to the overlapping component families are defined. Block 520 may include a non-machine implemented method to define, predefine, identify, and/or choose reliability statistics or equations or algorithms to determine reliability statistics to map to a given set of computations or arithmetic relationships among events and historical statistics of observations for a component, component families, and related component families to which the component belongs. Specifically, reliability statistics may be chosen to map to a given set of arithmetic relationships among events and historical statistics for a component, overlapping component families, and related component families where the events and historical statistics include a rate of hard errors over time, a rate of hard errors over bits transferred to and from a product over time, a rate of system "panics" over time as well as others as known in the art for a data storage device or mass storage device.

Block 520 may also include defining or determining initial reliability statistics according to initial received observations, events, and/or historical data for a product, or number of product devices in the field.

At block 530, data model parameters are defined for observations. Block 530 may include a non-machine implemented method for defining, pre-defining, or identifying data model parameters for observations (e.g., events and/or historical data) to gather, model, calculate, manipulate, analyze, categorize (e.g., split into categories), data or observations received at or retrieved by an automated system, such as auto-detection machine 5. Observations may include failures of reading data from or writing data to, a storage media location or segment thereof, data read speed, data write speed, media rotational speed, data input, or data output from a device, disk drive, or mass storage device or unit.

Block 530 may apply to defining data model parameters or observations received by an automated system from a data storage device, mass storage device, and/or server, such as described with respect to observations received by auto-detection machine 5 from server 2 at FIG. 1.

At block 540, statistical significant separations are defined. Block 540 may include a non-machine implemented method for defining, pre-defining, or identifying statistical significant separations between observations or data derived from observations (e.g., events and/or historical data) previously received and those currently received for a component, a component family, or a related family to a family to which a component belongs. For example, at block 540, a threshold or statistical significant separation may be defined between a family to which a component belongs and a related family to the family. In some cases, the threshold or statistical significant separation can be defined or programmed into machine 5 by a non-machine implemented method, such as by a person. From that time forward, autodetection machine 5 may detect indicators to a given level of significance according to the separation programmed in by implementing the processes described herein (e.g., such as process 600 of FIG. 6 described below).

At block 550, standards to assess whether a determination is different than a prior determination are defined. Block 550 may include a non-machine implemented method to define, pre-define, or identify standards to assess whether a determination is different than any previously made determination, such as a previous determination for an initial reliability statistic or a previously received observation. Moreover, block 550 may include defining standards between any two of a component, a family to which the component belongs, and a related family to the family to which the component belongs. Similar to the description for block 540 above, in some cases, the standards to assess whether a determination is different than any previously made determination can be defined or programmed into machine 5 by a non-machine implemented method, such as by a person. From that time forward, autodetection machine 5 may Assess whether a determination is different than any previously made determination according to the standards programmed in by implementing the processes described herein (e.g., such as process 600 of FIG. 6 described below).

Figure 6:
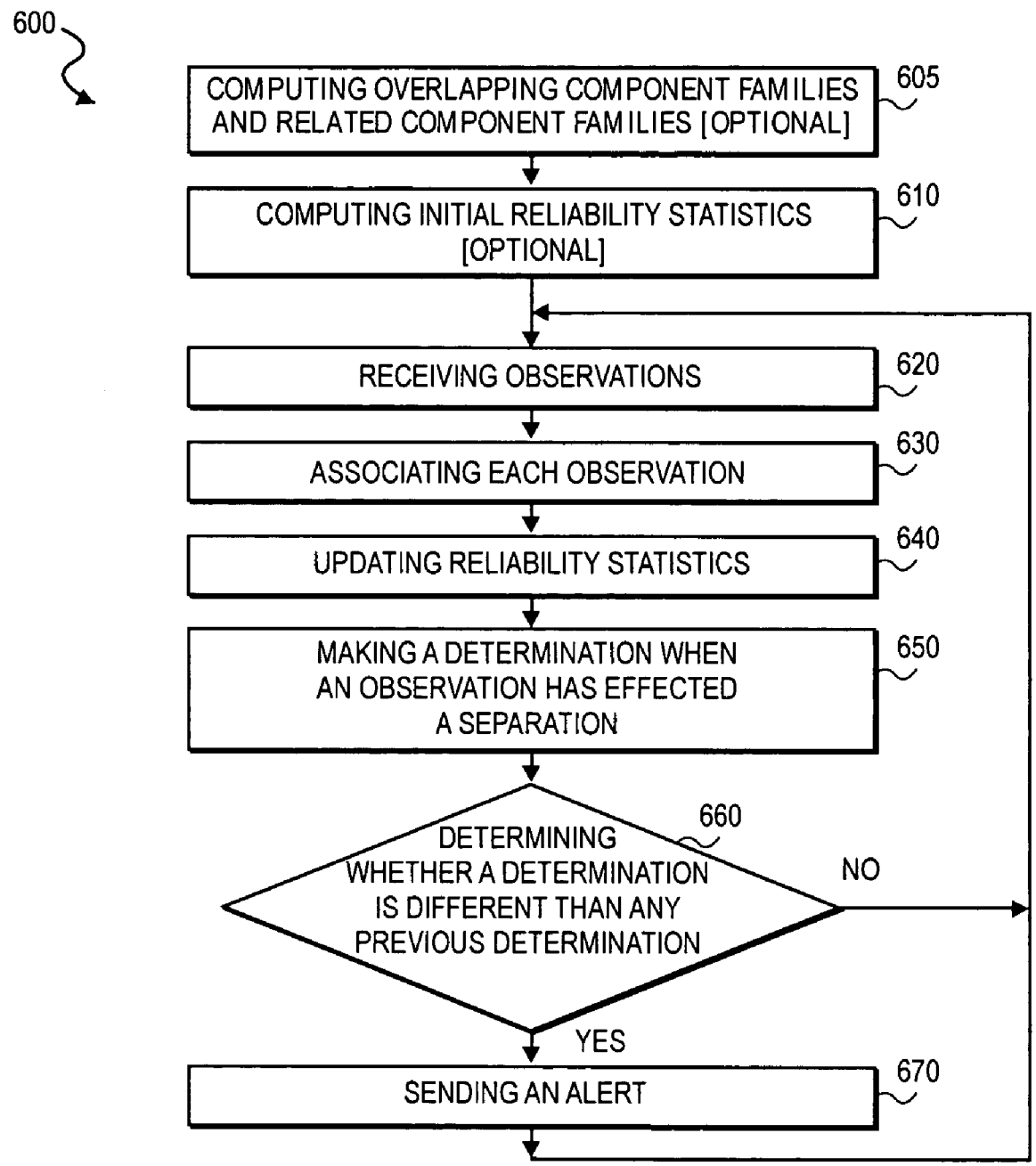
FIG. 6 is a flow diagram of a process for auto-detection of reliability indicators/failures.

FIG. 6 is a flow diagram of a process for auto-detection of reliability indicators/failures. FIG. 6 describes process which may be a process for detecting reliability indicators, such as for components, families of components, and related families of components of a device such as server 2 as described above with respect to FIGS. 1–3; and/or by using auto-detection machine 5, such as described above with respect to FIGS. 1 and 4. Process 600 is shown including optional block 605. Optional block 605 includes computing overlapping component families and/or related component families to which a component belongs. Block 605 may include descriptions above with respect to block 510 performed by an automated method, such as by auto-detection machine 5. Thus, block 605 may include computing or determining a related component family to each component family to which a component belongs based on a combinatorial expansion of configurations and individual variations observed in the families. Block 605 may include computing overlapping component families and related component families using an automated or non-automated method, as known in the art.

Process 600 may also optionally include computing initial reliability statistics at block 610. Block 610 may include an automated system, such as auto-detection machine 5, computing or determining initial reliability statistics values by computations or mathematical combination of prior observations, events, and/or historical data. Block 610 may include performing calculations as defined or described above with respect to block 520 of FIG. 5. Block 610 may include computing initial reliability statistics using an automated or non-automated system, as known in the art.

At block 620, observations are received by an automated system, such as auto-detection machine 5, and/or an aggregate point. Block 620 may include receiving observations from various product devices products, models, servers, and components thereof of various products in the field and storing those observations for subsequent retrieval and analysis. Block 620 may also include gathering by the automated system or receiving transmissions from remote product devices in the field over a network, such as network 3. Observations may be sent or transmitted by remote device products periodically, such as after iterations of a selected period of time. Also, observations may be sent after, as a result of, and/or due to detection of one or more events, reliability failures, or observations. For example, an observation may be produced or sent in as a result of an instance of a product after one or more selected time periods, and/or in response to one or more events in accordance with observations, events, and/or historical statistics defined for or relating to the product as described above with respect to blocks 510, 520, and/or 530 of FIG. 5. Block 620 may include a device transmitting and machine 5 receiving data, such as over a network, as known in the art.

Block 620 may also include storing received observations in a local memory, collected into a local repository database, table, file, set of files (e.g., local to auto-detection machine 5).

At block 630, each observation is associated to a component. Block 630 may include an automated system, such as auto-detection machine 5 associating, relating, or tying each observation to one or more identified components or configurations of components, at least one component family, and/or at least one related component family to a component family to which the component belongs. Moreover, each observation may be associated with, related to, tied to, a component identity, a component configuration, a component individual variation, and/or be associated with, related to, and/or tied to a set of events and historical statistics relating to the component, an overlapping family, and/or a related family to which the component belongs. Block 630 may include associating observations with identifications or configurations of components as known in the art.

Block 630 may include retrieving stored observations from a local memory (e.g., a memory local to auto-detection machine 5) such as those that were stored as described above with respect to block 620.

At block 640, reliability statistics are updated. Block 640 may include an automated system, such as auto-detection machine 5 computing, or calculating reliability statistics according to received observations of operational data of product devices in the field for one or more products using a set of computations performed on the observations, a set of uniquely identified components or unique configurations of components of each product, overlapping component families to which each component belongs, and/or related families to the overlapping families. Block 640 may include descriptions above with respect to block 520 and/or block 530. Updating at block 640 may include updating initial reliability statistics described above with respect to block 520 and/or block 610, according to received observations without recalculating the initial reliability statistics, by computation or mathematical combination of updated values with the initial values. For example, block 640 may include adding, or appending update values to initial, prior, or current values without recalculating the initial, prior, or current values to create an updated reliability statistic value.

Block 640 may also include determining reliability statistics for each identification or configuration of a component according to the observations associated at block 630 with the component, families to which the component belongs by examining all components of all families to which a component belongs, and related families to the families to which the component belongs by examining all components of all families to which the component belongs and all related families to all families to which the component belongs.

Block 640 may include updating according to a set of arithmetic operations without recalculating each reliability statistic at an aggregate point, upon receiving an observation according to a set of arithmetic operations performed on sets of events and historical statistics associated with the component, component family, and related component families to which the component belongs. Block 640 may include calculating or computing a reliability statistic as known in the art, with or without recalculating that statistic, using machine 5 or a process thereof.

Block 650 includes making a "determination" when an observation has effected a separation. Block 650 may include an automated system, such as auto-detection machine 5 identifying that a "determination" is made or has occurred when an observation has effected a statistically significant separation (e.g., such as by meeting a threshold) in a reliability statistic between an identification or configuration of a component, a component family, and/or a related component family to which the component family belongs. Making such a "determination" may include determining whether an observation causes a value to exceed a threshold value at an aggregate point. Block 650 may include descriptions above with respect to block 540 of FIG. 5.

A determination may include polling data for a result, making period analyses (e.g., analyses for a specific period of time) or waiting for a statistical sufficient sample size. For example, a determination may include waiting for a sufficient sample size to make a statistical determination according to a selected degree of significance regardless of a number of observations or period of time. In other words, a determination may not be based on a specific period of time, number of observations, amount of data, number of events, or otherwise, but instead may be based on whether there is enough samples of an observation, event, failure, or other reliability statistic to make a statistical determination to a specific degree of significance, such as a degree of significance selected according to an operation data model as described at block 510, reliability statistic as described at block 520, data model parameter as described at block 530, and/or statistical significant separation as described at block 540. Block 650 may include making a determination, as known in the art, using machine 5 or a process thereof.

At decision block 660, it is determined whether a "determination" is different than any previous determination. For example, block 660 may include an automated system, such as auto-detection machine 5 recording a determination, and comparing the determination to any previously made determination at an aggregate point. Block 660 may also include descriptions above with respect to block 550 of FIG. 5. Block 660 may include comparing a value of a determination to at least one previous value of a determination. Such comparing may include identifying whether a determination occurs more frequently, less frequently, a greater number of times, a fewer number of times, satisfies a sufficient sample size (e.g., to make a statistical determination according to a selected degree of significance), or effects a statistical determination when compared to occurrences of one or more other determination for an identification or configuration of a component, a component family, or a related component family thereof.

For example, block 660 may include identifying whether a failure or potential failure is occurring more frequently for one identity or configuration of a component, family of components, or related families as compared to how frequently that same determination is occurring for another component, family of components, or related families. Moreover, block 660 may include determining whether a determination satisfies a sufficient sample size to make a statistical determination according to a selected degree of significance regardless of a number of observations or period of time (e.g., analogous to the description above with respect to block 650 making a determination). Block 660 may include determining whether a determination is different, as known in the art, using machine 5 or a process thereof.

If at block 660, a determination is different, processing continues to block 670. Alternatively, if at block 660 a determination is not different, processing may return to block 620. It is also contemplated that, if at block 660 a determination is not different, processing may return to block 605, 610, 630, 640, or 650.

At block 670, an alert is sent. Block 670 may include sending an alert as described above with respect to FIG. 4. Moreover, block 670 may include sending an alert from an aggregate point. Thus, at block 670, an alert, reliability indicator, or report of potential unreliability, such as in the future, may be sent to a person, system administrator, automated device (e.g., see description with respect to FIG. 4) if a determination for a received observation is different than any previously made determination. As noted above for FIG. 2, alerts may be sent via email, such as in embodiments where the primary user interface (e.g., for a user, system operator or administrator of server 2 and/or machine 5) will be via a web page.

According to embodiments after sending an alert, process 600 may return to block 620. Alternatively, after block 670, process 600 may return to block 605, 610, 630, 640, or 650.

In the foregoing specification, specific embodiments are described. However, various modifications and changes may be made thereto without departing from the broader spirit and scope of embodiments as set forth in the claims. The specification and drawings are, accordingly, to be regarded in an illustrative rather than a restrictive sense.

What is claimed is:

1. A machine implemented method comprising:
   computing a plurality of reliability statistics according to a plurality of received observations of operational data of a plurality of products using a set of computations performed on the observations, a set of uniquely identified components of each product, and a plurality of overlapping component families of a plurality of component families to which the components belong; and
   storing the reliability statistics in a memory;
   wherein an operational data model of each of the plurality of products defines the set of uniquely identified components of the product.

2. The machine implemented method of claim 1, further comprising defining the overlapping component families prior to computing by a combinatorial expansion of one of: a) a common component included in more than one set of uniquely identified components of more than one product, and b) a similar component function included in more than one set of uniquely identified components of more than one product.

3. The machine implemented method of claim 1, wherein computing includes determining an initial plurality of reliability statistics according to an initial plurality of received observations of operational data of a plurality of products, and updating the initial plurality of reliability statistics according to a received observation without recalculating the initial plurality of reliability statistics.

4. The machine implemented method of claim 3, wherein computing includes determining an initial plurality of values, and updating the initial plurality of values by mathematical combination of a plurality of update values with the initial values without recalculating the initial plurality of values.

5. The machine implemented method of claim 1, wherein the product is a mass storage device.

6. The machine implemented method of claim 1, further comprising:
   making a determination when an observation has effected a statistically significant separation in a reliability statistics between a component and a component family to which the component belongs; and
   sending an alert if a determination is different than any previously made determination.

7. The machine implemented method of claim 1, wherein the observations include failures of one of reading data from a disk drive, writing data to a disk drive, a segment of disk drive media, data read speed of a disk drive, data write speed of a disk drive, rotation speed of a disk drive, data input to a disk drive, and data output from a disk drive.

8. The machine implemented method of claim 1, wherein the component families include at least one of a global system family of a plurality of products including a component of the components, a system family for a plurality of products including a component of the components, a component configuration family for a plurality of configurations of a component of the components, a component individual variation family for a plurality of variations of an individual configurations of the plurality of configurations.

9. A machine implemented method comprising:
   computing, by combinatorial expansion, an overlapping component family of a plurality of component families to which each component belongs of a set of uniquely identified components of a defined operational data model of a product;
   storing the overlapping component family in a memory;
   receiving a plurality of observations of operational data of the product;
   associating each observation to a component and at least one component family of the component; and
   determining a plurality of reliability statistics for each component according to a set of statistical computations performed on observations associated with the component and component families to which the component belongs by examining all components of all families to which a component belongs.

10. The machine implemented method of claim 9, wherein receiving a plurality of observations includes receiving the observations from a plurality of product devices over a network.

11. The machine implemented method of claim 10, wherein the observations are sent by a plurality of remote device products one of periodically and due to detection of one or more events.

12. The machine implemented method of claim 9, wherein receiving includes storing the received observations in a local memory, and associating includes retrieving a plurality of stored observations from the memory.

13. The machine implemented method of claim 9, further comprising:
   making a determination when an observation has effected a statistically significant separation in a reliability statistics between a component and a component family to which the component belongs; and
   sending an alert if a determination is different than any previously made determination.

14. The machine implemented method of claim 13, wherein making a determination includes determining whether an observation causes a reliability statistics value to exceed a threshold value, and sending an alert includes comparing the reliability statistics value to at least one previous valued.

15. The machine implemented method of claim 13, wherein receiving occurs at an aggregate point making occurs at the aggregate point and, sending occurs from the aggregate point.

16. The machine implemented method of claim 15, further comprising recording the made determination, and comparing the made determination to any previously made determinations at the aggregate point.

17. The machine implemented method of claim 9, wherein each component is identified by at least one of a component identity, a component configuration, component individual variation, and a set of component events and historical statistics relating to the component;
   wherein each observation is associated with one of a component identity, a component configuration, and a component individual variation, and is associated with the set of component events and historical statistics relating to the component; and
   wherein determining reliability statistics includes determining reliability statistics according to a set of statistical computations performed a plurality of sets of events and historical statistics associated with the component and component families to which the component belongs.

18. The machine implemented method of claim 17, further comprising a non-machine implemented method comprising:
   choosing the reliability statistics to map to a given set of arithmetic relationships among the sets of events and historical statistics.

19. The machine implemented method of claim 17, wherein the products includes a mass storage device, and the sets of events and historical statistics include one of a rate of hard errors over time, or rate of hard errors over bits transferred to and from the product; and a rate of system panics over time.

20. A machine implemented method comprising:
   computing, by combination of expansion, at least one overlapping component family of a plurality of component families to which each component belongs of a set of uniquely identified components of a defined operational data model of a product;
   storing the at least one overlapping component family in a memory;
   determining at least one related component family to each component family based on a combinatorial expansion of a plurality of configurations and individual variations observed in the component families;
   receiving a plurality of observations of operational data of the product;
   associating each observation to a component, at least one component family of the component, and at least one related component family; and determining a plurality of reliability statistics for each component according to a set of statistical computations performed on observations associated with the component, component families to which the component belongs, and related component families to component families to which the component belongs by examining all components of all component families to which the component belongs and all related component families to all component families to which the component belongs.

21. The machine implemented method of claim 20, further comprising:

making a determination when an observation has effected a statistically significant separation in a reliability statistics between a component and a component family to which the component belongs, or family to which the component belongs and a related family to the family; and sending an alert if a determination is different than any previously made determination.

22. The machine implemented method of claim 21, further comprising a manual method of defining a statistically significant separation between a family to which the component belongs and a related family to the family.

23. The machine implemented method of claim 20, wherein receiving a plurality of observations includes receiving the observations from a plurality of remote product devices.

24. A machine accessible storage medium containing a first sequence of instructions that, when executed, cause a machine to:

receive an observation of operational data of a product, wherein an operational data model of the product defines a set of uniquely identified components of the product, and each component belongs to at least one overlapping component family of a plurality of component families; storing the observation in a memory;

associate the observation to a component and to at least one component family of the component; and update a plurality of reliability statistics for each component and component family associated with the observation according to a set of statistical computations performed on the observation, the component, and the component families without recalculating the plurality of reliability statistics.

25. The machine accessible medium of claim 24, wherein receiving an observations includes receiving the observation over a network.

* * * * *